(12) United States Patent
Rose (10) Patent No.: US 8,310,488 B2
(45) Date of Patent: Nov. 13, 2012

(54) DYNAMIC CONTEXT SWITCHING BETWEEN ARCHITECTURALLY DISTINCT GRAPHICS PROCESSORS

(75) Inventor: Robert W. Rose, Bend, OR (US)

(73) Assignee: Sony Computer Intertainment America, Inc., Foster City, CA (US)

( * ) Notice: Subject to any disclaimer, the term of this patent is extended or adjusted under 35 U.S.C. 154(b) by 780 days.

(21) Appl. No.: 12/417,395

(22) Filed: Apr. 2, 2009
(Under 37 CFR 1.47)

(65) Prior Publication Data
US 2010/0253690 A1   Oct. 7, 2010

(51) Int. Cl.
*G06F 15/16* (2006.01)
*G06F 1/26* (2006.01)
*G06F 1/00* (2006.01)

(52) U.S. Cl. .................. 345/502; 713/320; 713/323

(58) Field of Classification Search .................. None
See application file for complete search history.

(56) References Cited

U.S. PATENT DOCUMENTS

| | | | |
|---|---|---|---|
| 2007/0283175 A1* | 12/2007 | Marinkovic et al. | 713/320 |
| 2008/0034238 A1* | 2/2008 | Hendry et al. | 713/323 |
| 2008/0204460 A1* | 8/2008 | Marinkovic et al. | 345/502 |
| 2010/0091025 A1* | 4/2010 | Nugent et al. | 345/502 |
| 2010/0141664 A1* | 6/2010 | Rawson et al. | 345/502 |
| 2010/0164968 A1* | 7/2010 | Kwa et al. | 345/545 |

OTHER PUBLICATIONS

*Cell Broadband Engine Architecture*, copyright International Business Machines Corporation, Sony Computer Entertainment Incorporated, Toshiba Corporation Aug. 8, 2005 which may be downloaded at http://cell.scei.co.jp/.

* cited by examiner

*Primary Examiner* — Kee M Tung
*Assistant Examiner* — Zhengxi Liu
(74) *Attorney, Agent, or Firm* — Joshua D. Isenberg; JDI Patent (57) ABSTRACT

Graphics processing in a computer graphics apparatus having architecturally dissimilar first and second graphics processing units (GPU) is disclosed. Graphics input is produced in a format having an architecture-neutral display list. One or more instructions in the architecture neutral display list are translated into GPU instructions in an architecture specific format for an active GPU of the first and second GPU.

17 Claims, 5 Drawing Sheets

DYNAMIC CONTEXT SWITCHING BETWEEN ARCHITECTURALLY DISTINCT GRAPHICS PROCESSORS

FIELD OF INVENTION

This invention relates to computer graphics processing, and more specifically to computer graphics processing using two or more architecturally distinct graphics processors.

BACKGROUND OF INVENTION

Many computing devices utilize high-performance graphics processors to present high quality graphics. High performance graphics processors consume a great deal of power (electricity), and subsequently generate a great deal of heat. In portable computing devices, the designers of such devices must trade off market demands for graphics performance with the power consumption capabilities of the device (performance vs. battery life). Some laptop computers are beginning to solve this problem by introducing two GPUs in one laptop—one a low-performance, low-power consumption GPU and the other a high-performance, high-power consumption GPU—and letting the user decide which GPU to use.

Often, the two GPUs are architecturally dissimilar. By architecturally dissimilar, it is meant that the graphical input formatted for one GPU will not work with the other GPU. Such architectural dissimilarity may be due to the two GPUs having different instruction sets or different display list formats that are architecture specific.

Unfortunately, architecturally dissimilar GPUs are not capable of cooperating with one another in a manner that allows seamless context switching between them. Therefore a problem arises in computing devices that use two or more architecturally dissimilar GPUs in that in order to switch from one GPU to another the user must stop what they are doing, select a different GPU, and then reboot the device. This is somewhat awkward even with a laptop computer and considerably more awkward with hand-held portable computing devices such as mobile internet access devices, cellular telephones, hand-held gaming devices, and the like.

It would be desirable to allow the context switching to be hidden from the user and performed automatically in the background. Unfortunately, no solution is presently available that allows for dynamic, real-time context switching between architecturally distinct GPUs. The closest prior art is the Apple MacBook Pro, from Apple Computer of Cupertino, Calif., which contains two architecturally distinct GPUs but does not allow dynamic context switches between them. Another prior art solution is the Scalable Link Interface (SLI) architecture developed by nVidia Corporation of Santa Clara, Calif. This architecture lets a user run one or more GPUs in parallel, but only for the purpose of increasing performance, not to reduce power consumption. Also, this solution requires the two GPUs to be synchronized when the system is enabled, again requiring some amount of user intervention.

It is within this context that embodiments of the current invention arise.

DESCRIPTION OF THE SPECIFIC EMBODIMENTS

Figure 1:
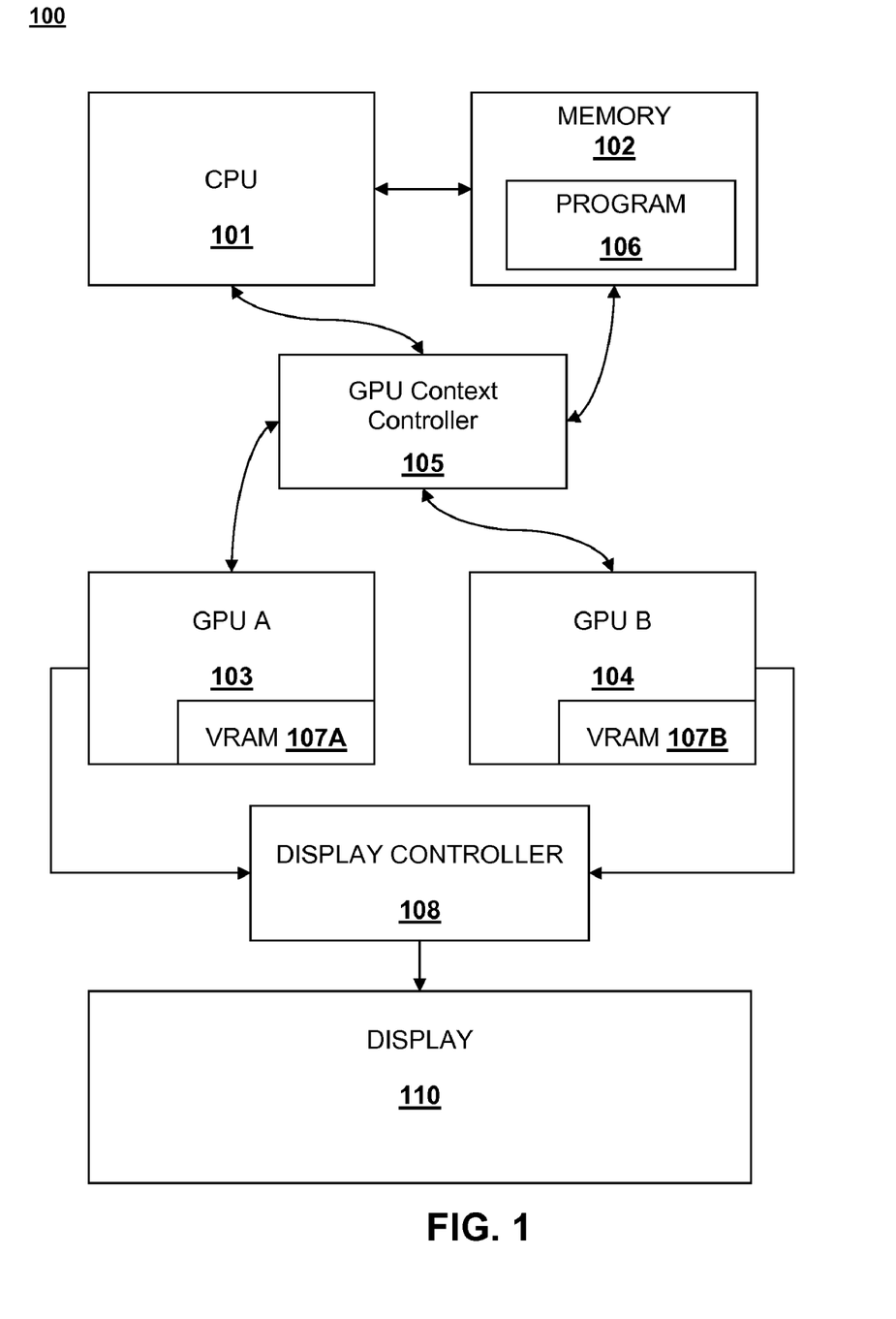
FIG. 1 is a block diagram illustrating an example of a computer graphics system according to an embodiment of the present invention.
Figure 2A:
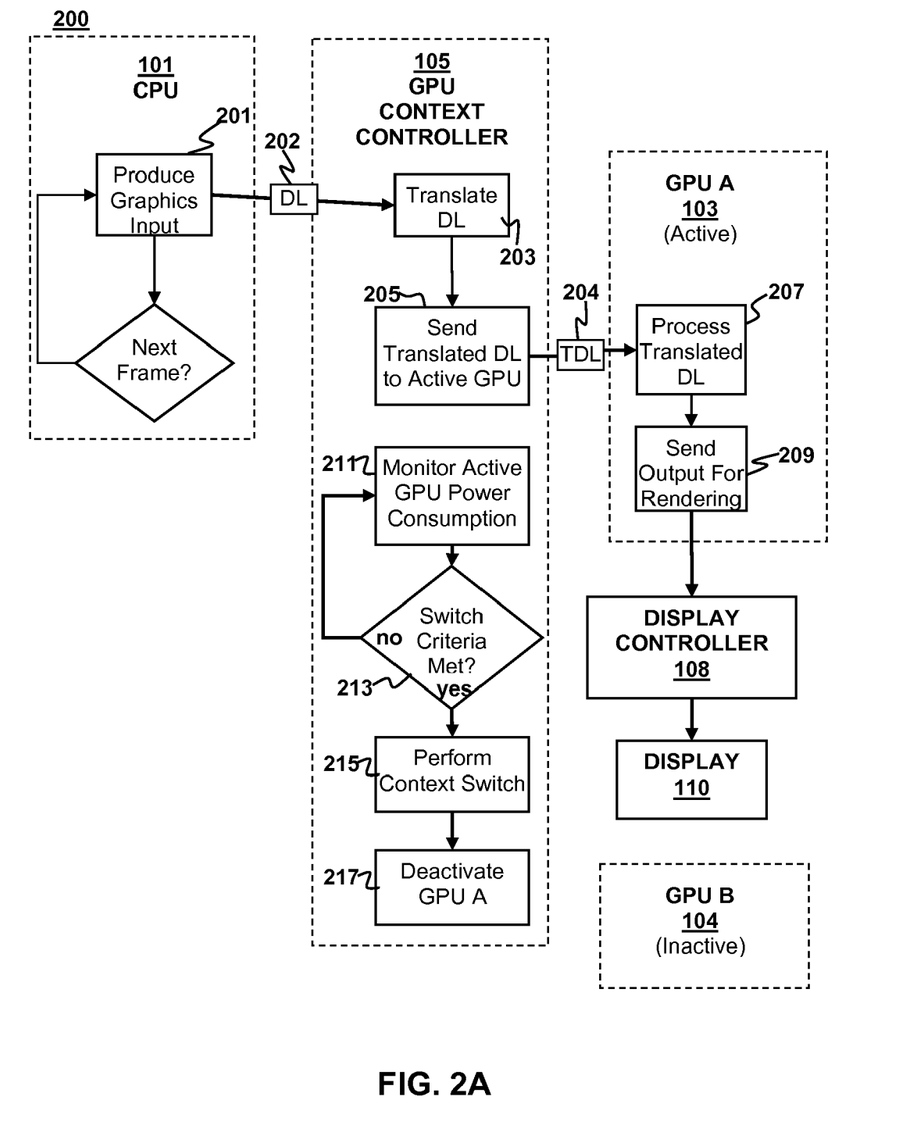
FIG. 2A is a flow diagram illustrating computer graphics processing with two architecturally distinct graphics processors in accordance with an embodiment of the present invention.

Embodiments of the present invention utilize a graphics processing system and method that allows two or more architecturally distinct GPUs with varying power consumption profiles to be combined so that certain graphics processing operations may transition seamlessly between the two GPUs without user intervention or even the user's knowledge. This is accomplished using an architecture-neutral display list instruction set in software, and having a specialized piece of hardware (the "GPU Context Controller") sit between the GPUs that translates the architecture-neutral instruction set into the architecture-specific instruction set of the given GPU:

According to an embodiment of the present invention, a graphics processing system, e.g., as shown in FIG. 1 may be configured to implement certain portions of a graphics processing method, e.g., as described below with respect to FIG. 2A and FIG. 2B.

The system 100 may include a central processing unit (CPU) 101, a memory 102 first graphics processing unit (GPU) 103, a second GPU 104 and a GPU context controller 105. The memory 102 is coupled to the CPU 101. The memory 102 may store applications and data for use by the CPU 101. The memory 102 may be in the form of an integrated circuit, e.g., Random Access Memory (RAM), Dynamic Random Access Memory (DRAM), Read-Only Memory (ROM), and the like). By way of example, and not by way of limitation, the memory 102 may be in the form of RAM.

A computer program 106 may be stored in the memory 102 in the form of instructions that can be executed on the CPU 101. The instructions of the program 106 may be configured to implement, amongst other things, certain parts of a graphical processing method that involves a context switch between the first and second graphics processing units 103, 104. The program 106 may perform physics simulations, vertex processing and other calculations related to drawing one or more images. The program 106 may also determine which of the GPU 103, 104 is to be used for rendering the one or more images.

The GPU 103, 104 receive input (e.g., data and/or instructions) resulting from the computations performed by the program 106 and further process the input to render the one or more images on a display 110. Each of the GPU 103, 104 may have a corresponding associated video RAM (VRAM) 107A, 107B. Each VRAM 107A, 107B allows the CPU 101 to process an image at the same time a GPU 103, 104 reads it out to a display controller 108 coupled to the display 110. By way of example, the VRAM 107A, 107B may be implemented in the form of dual ported RAM that allows multiple reads or writes to occur at the same time, or nearly the same time. Each VRAM 107A, 107B may contain both input (e.g., textures)

and output (e.g., buffered frames). Each VRAM 107 may be implemented as a separate local hardware components of each GPU. Alternatively, each VRAM 107 may be virtualized as part of the main memory 102.

The GPU 103, 104 are in general, architecturally dissimilar. As noted above, the term "architecturally dissimilar" means that graphical input formatted for one GPU 103 will not work with the other GPU 104 and vice versa. By way of example, and not by way of limitation, the two GPU may have different instruction sets, different display lists, or both. In addition, in some embodiments, the two GPU 103, 104 may have different processing performance and power consumption characteristics.

To facilitate fast context switching between the two GPU 103, 104, the program 106 generates the input, e.g., a display list, for the GPU 103, 104 in an architecture neutral format. As used herein, the term "architecture neutral-format" refers generally to a format that does not depend on a specific processor architecture of a particular GPU. The input is sent to the GPU Context Controller 105, which may be implemented in hardware, e.g., as an application specific integrated circuit (ASIC) or in software, e.g., as a logic block of coded instructions running on the CPU.

The GPU Context Controller 105 may be implemented as a just-in-time compiler, which compiles the input from the architecture neutral format into a format that is specific to one of the GPU 103, 104 or the other. The GPU that is to receive the compiled input is referred to herein as the active GPU. The GPU that does not receive the compiled input is referred to herein as the inactive GPU. The GPU Context Controller 105 translates architecture-neutral display list instructions to the architecture-specific display list instruction set of the active GPU. The resulting instruction set is then sent to the active GPU for rendering. The inactive GPU is shut down while the active GPU is in use. Shutting down the inactive GPU can provide a considerable reduction in power consumption.

In addition to translating the instruction set, the GPU Context Controller 105 may monitor power consumption metrics for the active GPU to determine which of the GPU 103, 104 should be used as the active GPU. The GPU Context Controller 105 may also dynamically perform context switches between the two GPUs 103, 104 based on active load, anticipated load and/or direct selection messages from the CPU 101. Context switches may be performed by reading the GPU state from one GPU, translating the state to the format of the other, and then uploading the state to the other GPU. If necessary, the Context Controller 105 may transfer VRAM contents one GPU to another. This requires the architecture-neutral display list to reference VRAM contents by virtual address instead of direct address. After a context switch the GPU Context Controller 105 may instruct the video display controller 108 to switch the VRAM address for framebuffer access.

The system described above may implement a graphics processing method according to an embodiment of the present invention. By way of example, and not by way of limitation, a computer-implemented graphics processing method 200 may proceed as illustrated in FIG. 2A. Specifically, the CPU 101 may produce graphics input for a GPU, as indicated at 201. The CPU 101 may produce graphics input for a sequence of frames processing each frame in the order in which it is to be displayed on the display device 110. As described above, the graphics input includes an architecture-neutral display list 202. The GPU Context Controller 105 translates the display list 202 into an architecture specific format for the active GPU, as indicated at 203. In the example illustrated in FIG. 2A GPU A 103 is active and GPU B 104 is inactive.

The GPU Context Controller 105 sends the translated display list 204 to the active GPU A 103 for processing, as indicated at 205. GPU A 103 processes the translated display list, as indicated at 207 and generates output for rendering. The output is sent to the display controller 108 for rendering on the display device 110 as indicated at 209.

To facilitate optimum power consumption, the GPU Context Controller 105 may monitor the power consumption of the active GPU, as indicated at 211 for the purpose of determining whether or not to perform a context switch. The GPU Context Controller 105 may also wait for a signal from the CPU 101 indicating that a context switch between the currently active GPU and the currently inactive GPU should be performed. If one or more criteria for performing a context switch are met, as indicated at 213, the GPU Context Controller 105 may perform a context switch, as indicated at 215. The GPU Context Controller 105 may the deactivate GPU A, e.g., by shutting it down, if it is to be no longer active after the context switch.

Figure 2B:
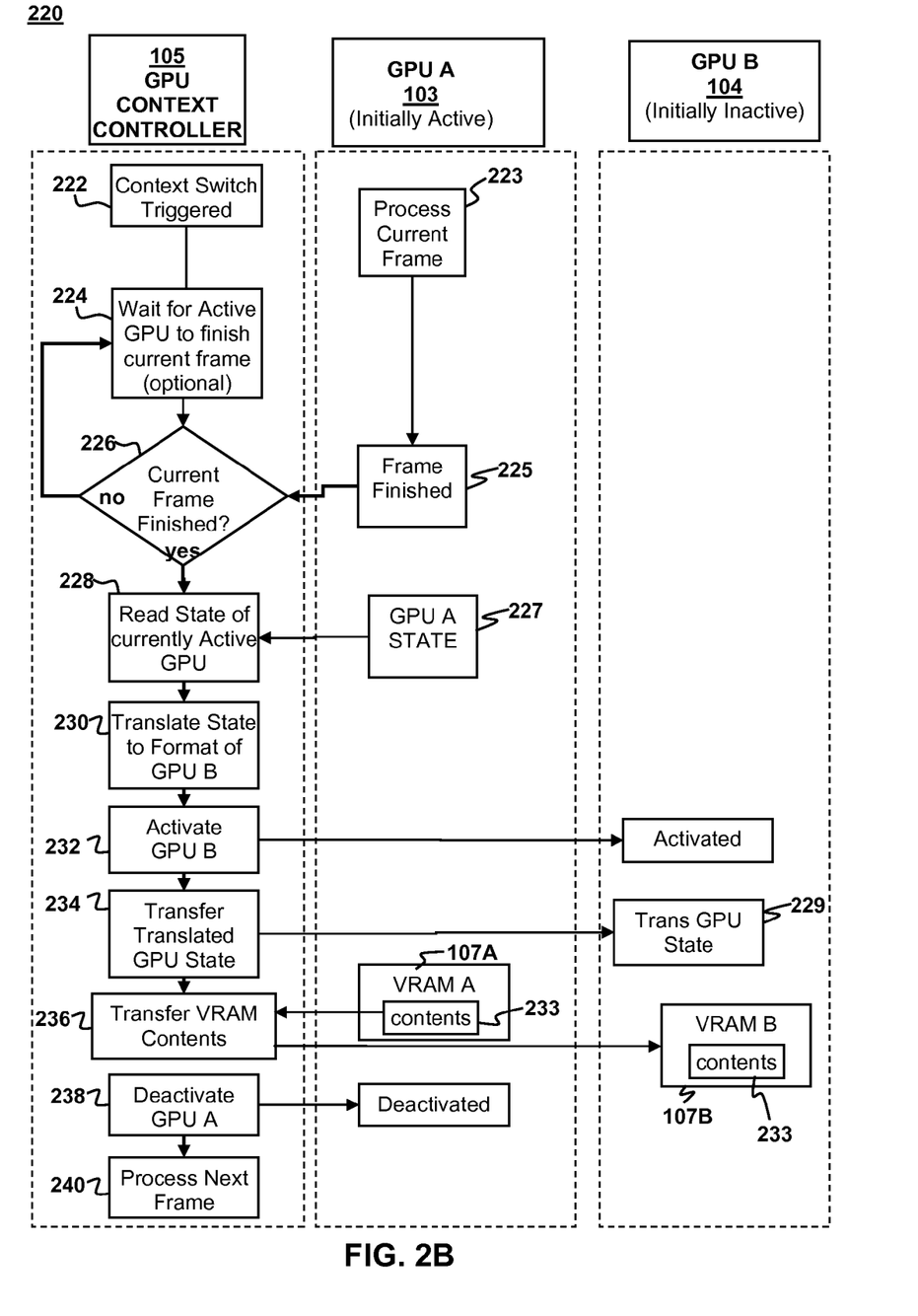
FIG. 2B is a flow diagram illustrating an example of a context switch between two architecturally distinct graphics processors in accordance with an embodiment of the present invention.

FIG. 2B illustrates an example of a context switch 220. In this example, GPU A 103 is initially active and GPU B 104 is initially inactive. As indicated at 222 a context switch is triggered. There are a number of different ways of triggering a context switch. One way, as indicated above, is based on monitoring of power consumption of the active GPU. For example, GPU A and GPU B may have different power consumption and processing capabilities. By way of example, and not by way of limitation, GPU A may be a high power GPU and GPU B may be a low power GPU having lower power consumption than GPU A and a maximum processing capacity that is less than a maximum processing capacity of GPU A. In such a case, the GPU Context Controller 105 may be configured (e.g., programmed) to perform a context switch from GPU A to the GPU B if the GPU A is active operating at a processing capacity that is less than or equal to the maximum processing capacity GPU B.

Alternatively, if GPU A is the lower power GPU and GPU B is the high power GPU, the GPU Context Controller 105 may perform a context switch from GPU A to GPU B if GPU A is operating at its maximum processing capacity, and a frame render time is decreasing.

In some implementations, it may be desirable for the GPU Context Controller 105 to way for active GPU A 103 to finish processing a currently processing frame as indicated at 223 and 225 before implementing a context switch. The GPU Context Controller 105 may wait, as indicated at 224 until processing is finished as indicated at 226. To implement the context switch, the GPU Context Controller 105 may read a state 227 of the active GPU A 103, as indicated at 228. The state may then be translated into a translated GPU state 229 that is in a format suitable for use by GPU B 104 as indicated at 230. The GPU context controller 105 may activate GPU B 104, as indicated at 232. Activation of GPU B 104 may take place either before or after translating the state of GPU A 103. Once GPU B 104 is activated, the translated GPU state 229 may be transferred to GPU B 104, as indicated at 234. In some embodiments, the GPU Context Controller 105 may optionally read the contents 233 of the VRAM 107A of GPU A 103 and transfer them to the VRAM 107B of GPU B 104, as indicated at 236. Once the GPU Context Controller 105 has extracted from GPU A 103 the information necessary for the context switch, GPU A 103 may be deactivated, as indicated at 238. The GPU Context Controller 105 may then process the next frame as indicated at 240. Subsequent processing would involve translating the display list 202 from the CPU 101 into the architecture specific format for GPU B 104 and sending the resulting translated display list 204 to GPU B 104 for processing.

It is noted that the order of operations shown in FIG. 2B is meant as an example and is not the only possible order. For example, it is possible to deactivate GPU A before activating GPU B if the necessary information for performing the context switch (e.g., state 227 and VRAM contents 233 have been extracted from GPU A and stored, e.g., in memory 102.

The above-described approach to reducing power consumption requirements in a GPU is a considerable departure from current power-reducing measures. Current power reducing measures in modern GPUs involve "power stepping" in which parts of the GPU are disabled based on load. While these measures may have a small impact on power consumption, they do not have as great effect as disabling an entire GPU. Using two architecturally distinct GPUs is also a bold approach, because it involves the production of an architecture-neutral display list.

Figure 3:
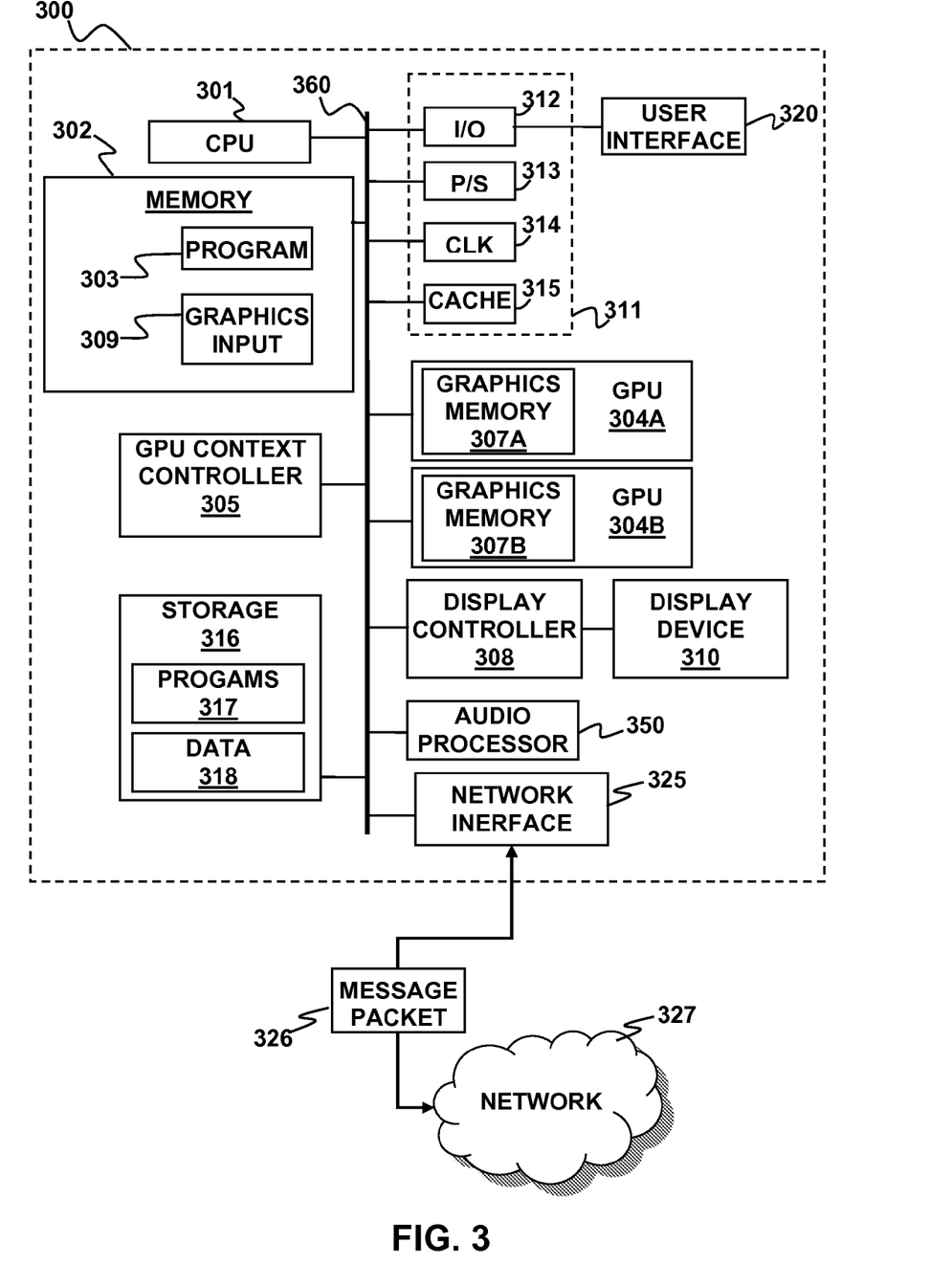
FIG. 3 is a block diagram of a computer graphics apparatus according to an embodiment of the present invention.

A graphics processing apparatus may be configured in accordance with embodiments of the present invention in any of a number of ways. By way of example, FIG. 3 is a more detailed block diagram illustrating a graphics processing apparatus 300 according to an embodiment of the present invention. By way of example, and without loss of generality, the graphics processing system 300 may be implemented as part of a computer system, such as a personal computer, video game console, personal digital assistant, cellular telephone, hand-held gaming device, portable internet device or other digital device.

The apparatus 300 generally includes a central processing unit (CPU) 301, a memory 302, two or more graphics processing units (GPU) 304A, 304B, and a GPU Context Controller 305. The system may further include a display controller 308 coupled to a display device 310.

The apparatus 300 may also include well-known support functions 311, such as input/output (I/O) elements 312, power supplies (P/S) 313, a clock (CLK) 314 and cache 315. The apparatus 300 may further include a storage device 316 that provides non-volatile storage for software instructions 317 and data 318. By way of example, the storage device 316 may be a fixed disk drive, removable disk drive, flash memory device, tape drive, CD-ROM, DVD-ROM, Blu-ray, HD-DVD, UMD, or other optical storage devices.

The CPU 301 may include one or more processing cores. By way of example and without limitation, the CPU 301 may be a parallel processor module, such as a Cell Processor. An example of a Cell Processor architecture is described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at http://cell.s-cei.co.jp/, the entire contents of which are incorporated herein by reference.

The CPU 301 may be configured to run software applications and optionally an operating system. The software applications may include graphics processing software 303 portions of which may be stored in the memory 302 and loaded into registers of the CPU 301 and/or GPU Context Controller 305 for execution.

The CPU 301 and GPU Context Controller 305 may be configured to implement the operations described above with respect to FIG. 2A and FIG. 2B. Specifically, the graphics processing software 303 may include instructions that, upon execution, cause the CPU 301 to produce graphics input 309 for the GPU 304A, 304B. The graphics input 309 may be in a format having an architecture-neutral display list. The GPU Context Controller 305 may be configured to translate instructions in the architecture neutral display list into an architecture specific format for one of the GPU 304A, 304B or the other depending on which one of them is active. The GPU Context controller 305 may also be configured to determine whether to perform a context switch between the two GPU 304A, 304B, to perform the context switch, and to shut down the GPU that is inactive after the context switch.

There are a number of ways in which the GPU Context Controller 305 may be configured to perform the above-described tasks. In general, the GPU Context Controller 305 may be configured to execute software instructions of the graphics processing program 303. By way of example, the GPU Context Controller 305 may be implemented as a dedicated separate processor component that is completely independent of the CPU 301. Alternatively, the GPU Context Controller 305 may be implemented within the CPU 301. For example, if the CPU 301 has a multi-core or parallel processor architecture having multiple processor elements, the functions of the GPU Context Controller 305 may be implemented through instructions executed on one or more of these processor elements. Alternatively, the functions of the GPU Context Controller 305 may be implemented through a software thread of the program 303 that runs on the CPU 301. Thus, although the CPU Context Controller 305 is shown as a separate block in FIG. 3, embodiments of the present invention encompass implementation of the CPU Context Controller 305, and/or its functions on the CPU 301.

The GPU 304A, 304B may be architecturally dissimilar, as described above. Each graphics processing unit (GPU) 304A, 304B may include a graphics memory 307A, 307B such as a video RAM. Each graphics memory 307A, 307B may include a display memory (e.g., a frame buffer) used for storing pixel data for each pixel of an output image. Each graphics memory 307A, 307B may be integrated in the same device as the corresponding GPU 304A, 304B, connected as a separate device with the corresponding GPU 304A, 304B, and/or implemented within the memory 302. Pixel data may be provided to either graphics memory 307A, 307B directly from the CPU 301 or via the GPU Context Controller 305. Alternatively, the CPU 301 or GPU Context Controller 305 may provide the active GPU 304A or 304B with data and/or instructions defining the desired output images, from which the active GPU may generate the pixel data of one or more output images. The data and/or instructions defining the desired output images may be stored in memory 302 and/or graphics memory 307A, 307B. In one embodiment, one or both GPU 304A, 304B may be configured (e.g., by suitable programming or hardware configuration) with 3D rendering capabilities for generating pixel data for output images from instructions and data defining the geometry, lighting, shading, texturing, motion, and/or camera parameters for a scene. The GPU 304A, 304B may further include one or more programmable execution units capable of executing shader programs.

As noted above, only one of the GPU 304A, 304B is active at a time. The active GPU may periodically output pixel data for an image from the corresponding graphics memory to be displayed on the display device 310. The display device 308 may be any device capable of displaying visual information in response to a signal from the client device 300, including CRT, LCD, plasma, and OLED displays. The display controller 308 may convert the pixel data to signals that display device 310 uses to generate visible images. The display controller 308 may provide the display device 310 with analog or digital signals. By way of example, the display 310 may include a cathode ray tube (CRT) or flat panel screen that displays visible text, numerals, graphical symbols or images.

One or more user interface devices 320 may be used to communicate user inputs from one or more users to the system 300. By way of example, one or more of the user input devices 320 may be coupled to the system 300 via the I/O elements 312. Examples of suitable input device 320 include keyboards, computer mice, joysticks, touch pads, touch screens, light pens, still or video cameras, and/or microphones.

The apparatus 300 may include a network interface 325 to facilitate communication via an electronic communications network 327. The network interface 325 may be configured to implement wired or wireless communication over local area networks and wide area networks such as the Internet. The system 300 may send and receive data and/or requests for files via one or more message packets 326 over the network 327.

In addition, the apparatus 300 may optionally include one or more audio speakers that produce audible or otherwise detectable sounds. To facilitate generation of such sounds, the apparatus 300 may further include an audio processor 330 adapted to generate analog or digital audio output from instructions and/or data provided by the CPU 301, memory 302, and/or storage 316.

The components of the apparatus 300, including the CPU 301, memory 302, GPU 304A, 304B, GPU Context Controller 305, support functions 311, data storage 316, user input devices 320, network interface 325, and audio processor 350 may be operably connected to each other via one or more data buses 360. These components may be implemented in hardware, software or firmware or some combination of two or more of these.

Figure 4:
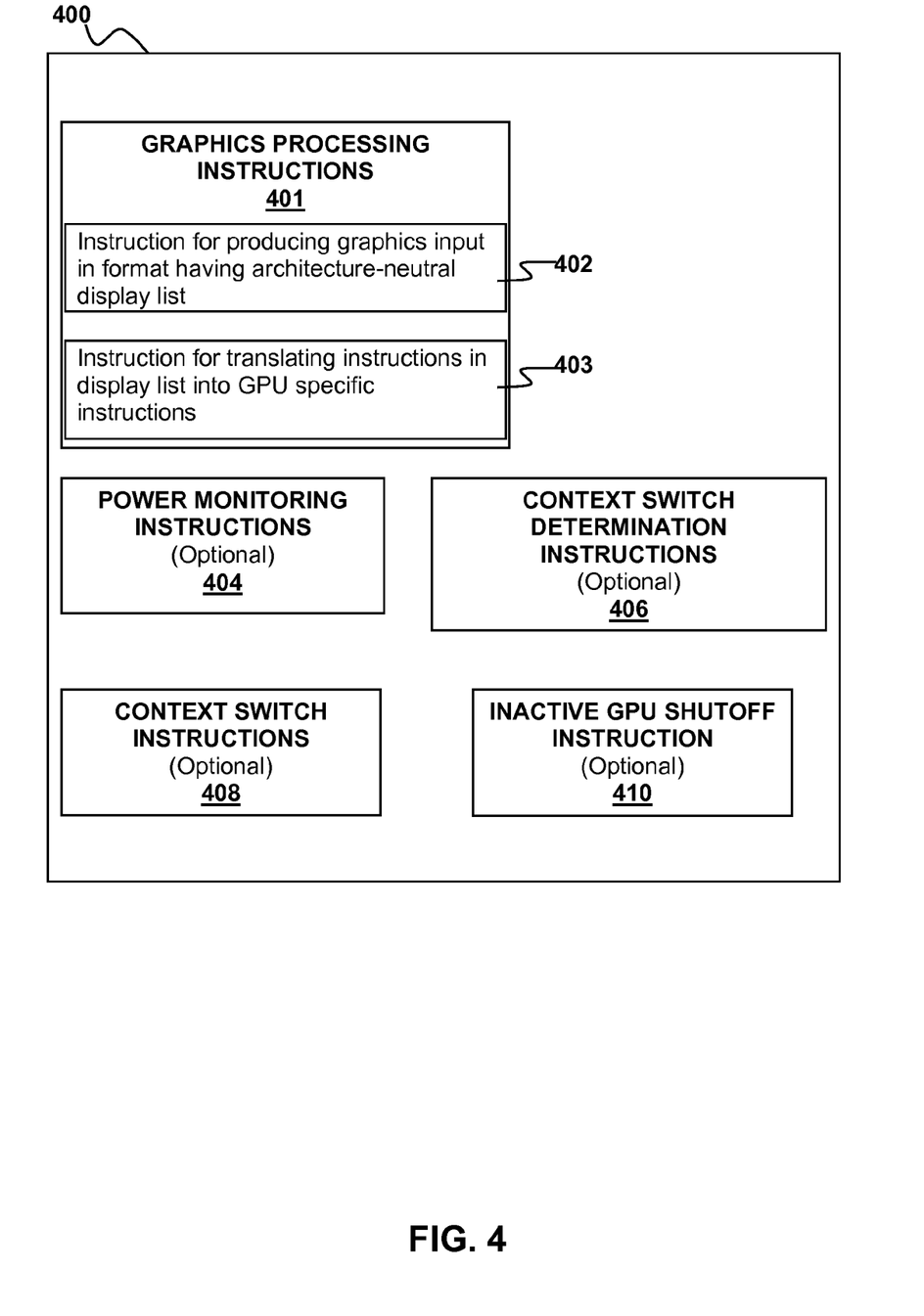
FIG. 4 is a block diagram of a computer readable medium containing computer readable instructions for implementing a computer graphics processing method in a computer graphics apparatus having a central processing unit (CPU) and architecturally dissimilar first and second graphics processing units (GPU) in accordance with an embodiment of the present invention.

According to another embodiment, instructions for carrying out graphics processing as described above may be stored in a computer readable storage medium. By way of example, and not by way of limitation, FIG. 4 illustrates an example of a computer-readable storage medium 400. The storage medium contains computer-readable instructions stored in a format that can be retrieved interpreted by a computer processing device. By way of example, and not by way of limitation, the computer-readable storage medium 400 may be a computer-readable memory, such as random access memory (RAM) or read only memory (ROM), a computer readable storage disk for a fixed disk drive (e.g., a hard disk drive), or a removable disk drive. In addition, the computer-readable storage medium 400 may be a flash memory device, a computer-readable tape, a CD-ROM, a DVD-ROM, a Blu-ray, HD-DVD, UMD, or other optical storage medium.

The storage medium 400 contains Graphics processing instructions 401 including one or more instructions 402 for producing graphics input in a format having an architecture-neutral display list, and one or more instructions 403 for translating instructions in an architecture-neutral display list into GPU-specific instructions. The medium 400 may also optionally include one or more power monitoring instructions 404, one or more context switch determination instructions 406, one or more context switch instructions 408 and one or more inactive GPU shutoff instructions 410. The power monitoring instructions 404 may be configured for monitoring power consumption and/or performance of a GPU, e.g., as described above with respect to item 211 of FIG. 2A. The context switch determination instructions 406 may be configured for determining whether one or more criteria for triggering a context switch are met, as discussed above with respect to 213 of FIG. 2A and 222 of FIG. 2B. The context switch instructions 408 may be configured for performing a context switch between two GPU, e.g., as described above with respect to 224, 226, 228, 230, 232, 234, 236, 238, and 240 of FIG. 2B. The inactive GPU shutoff instructions 410 may be configured for shutting of a GPU that is inactive after a context switch, e.g., as described above with respect to 217 of FIG. 2A.

Embodiments of the present invention as described herein may be extended to enable dynamic load balancing between two or more graphics processors for the purpose of increasing performance at the cost of power, but with architecturally similar GPUs (not identical GPUs as with SLI). By way of example, and not by way of limitation, a context switch may be performed between the two similar GPUs based on which one would have the higher performance for processing a given set of GPU input. Performance may be based, e.g., on an estimated amount of time or number of processor cycles to process the input.

If two GPUs are sufficiently architecturally similar, graphical input formatted for one GPU will work with the other GPU and vice versa. In such a case, it would not be necessary to generate the input in an architecture neutral format and translate it to an architecture specific format.

Another solution would be to have the CPU interpret the architecture neutral instruction set and have the GPU Context Controller completely shut down the GPU. Graphics performance might severely degrade but potentially less power would be consumed. According to this solution the CPU would take over the processing tasks handled by the GPU. In such a case, this solution may be implemented in a system with just one GPU. Specifically, the CPU could take over for the GPU by performing a context switch between the GPU and the CPU.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for".

Throughout this description, the embodiments and examples shown should be considered as exemplars, rather than limitations on the apparatus and methods disclosed or claimed. Although many of the examples presented herein involve specific combinations of acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

As used herein, "and/or" means that the listed items are alternatives, but the alternatives also include any combination of the listed items.

What is claimed is:

1. A computer graphics apparatus, comprising:
   a) a central processing unit (CPU), wherein the CPU is configured to produce graphics input in a format having an architecture-neutral display list for a sequence of frames;
   b) a memory coupled to the central processing unit;
   c) first and second graphics processing units (GPU) coupled to the central processing unit, wherein the first GPU is architecturally dissimilar from the second GPU; and
   d) a just-in-time compiler coupled to the CPU and the first and second GPU configured to translate instructions in the architecture neutral display list into an architecture specific format for an active GPU of the first and second GPU,
   wherein the just-in-time compiler is configured to:
      i) monitor a power consumption of the active GPU, and
      ii) determine whether to switch between the active GPU and an inactive GPU of the first and second GPU based on the power consumption of the active GPU,
      iii) perform a context switch between the active GPU and the inactive GPU, wherein the active GPU becomes inactive and the inactive GPU becomes active to process a next frame of the sequence of frames, and
      iv) turn off the one of the first and second GPU that is inactive after the context switch.

2. The apparatus of claim 1 wherein just-in-time compiler is configured to perform the context switch by reading a GPU state from the one of the first and second GPU that is active before the context switch, translating the state to a format of the other GPU of the first and second GPU, and then uploading the state to the other GPU.

3. The apparatus of claim 2 wherein the just-in-time compiler is configured to transfer contents of a video RAM of the GPU that is inactive after the context switch to a video RAM of the GPU that is to be active after the context switch.

4. The apparatus of claim 2 wherein the just-in-time compiler is configured to translate a register state for the GPU that is active before the context switch to a register state format for the GPU that is to be active after the context switch.

5. The apparatus of claim 1 wherein the first GPU is a high power GPU and the second GPU is a low power GPU having lower power consumption than the high power GPU and a maximum processing capacity that is less than a maximum processing capacity of the high power GPU.

6. The apparatus of claim 5 wherein the just-in-time compiler is configured to perform a context switch from the high power GPU to the low power GPU if the high power GPU is the active GPU and the high power GPU is operating at a processing capacity that is less than or equal to the maximum processing capacity of the low power GPU.

7. The apparatus of claim 5 wherein the just-in-time compiler is configured to perform a context switch from the low power GPU to the high power GPU if the low power GPU is the active GPU, the low power GPU is operating at its maximum processing capacity, and a frame render time for the apparatus is decreasing.

8. The apparatus of claim 1, further comprising a display controller coupled to the first and second GPU.

9. The apparatus of claim 8, further comprising an image display device coupled to the display controller.

10. In a computer graphics apparatus having a central processing unit (CPU) and architecturally dissimilar first and second graphics processing units (GPU) a computer implemented graphics processing method, comprising:
    a) producing graphics input in a format having an architecture-neutral display list for a sequence of frames with the CPU;
    b) translating by a just-in-time compiler one or more instructions in the architecture neutral display list into GPU instructions in an architecture specific format for an active GPU of the first and second GPU;
    b') performing graphics processing with the active GPU using the GPU instructions in the architecture specific format for the active GPU;
    c) displaying one or more images on a display device using signals derived from the active GPU as a result of execution of the GPU instructions in the architecture specific format for the active GPU;
    d) monitoring a power consumption of the active GPU,
    e) determining whether to switch between the active GPU and an inactive GPU of the first and second GPU based on the power consumption of the active GPU,
    f) performing a context switch between the active GPU and the inactive GPU, wherein the active GPU becomes inactive and the inactive GPU becomes active to process a next frame of the sequence of frames, and
    g) turning off the one of the first and second GPU that is inactive after the context switch.

11. The method of claim 10, wherein performing the context switch includes reading a GPU state from the one of the first and second GPU that is active before the context switch, translating the state to a format of the other GPU of the first and second GPU, and then uploading the state to the other GPU.

12. The method of claim 11, wherein performing the context switch further comprises transferring contents of a video RAM of the GPU that is inactive after the context switch to a video RAM of the GPU that is to be active after the context switch.

13. The method of claim 11, wherein performing the context switch further comprises translating a register state for the GPU that is active before the context switch to a register state format for the GPU that is to be active after the context switch.

14. The method of claim 10 wherein the first GPU is a high power GPU and the second GPU is a low power GPU having lower power consumption than the high power GPU and a maximum processing capacity that is less than a maximum processing capacity of the high power GPU.

15. The method of claim 14 wherein performing the context switch includes performing a context switch from the high power GPU to the low power GPU if the high power GPU is the active GPU and the high power GPU is operating at a processing capacity that is less than or equal to the maximum processing capacity of the low power GPU.

16. The method of claim 14 wherein performing the context switch includes performing a context switch from the low power GPU to the high power GPU if the low power GPU is the active GPU, the low power GPU is operating at its maximum processing capacity, and a frame render time for the apparatus is decreasing.

17. A non-transitory computer readable storage medium, having embodied therein computer readable instructions for implementing a computer graphics processing method in a computer graphics apparatus having a central processing unit (CPU) and architecturally dissimilar first and second graphics processing units (GPU), the method comprising:

a) producing graphics input in a format having an architecture-neutral display list for a sequence of frames with the CPU;

b) translating by a just-in-time compiler one or more instructions in the architecture neutral display list into GPU instructions in an architecture specific format for an active GPU of the first and second GPU;

c) performing graphics processing with the active GPU using the GPU instructions in the architecture specific format for the active GPU;

d) displaying one or more images on a display device using signals derived from the active GPU as a result of execution of the GPU instructions in the architecture specific format for the active GPU;

e) monitoring a power consumption of the active GPU, f) determining whether to switch between the active GPU and an inactive GPU of the first and second GPU based on the power consumption of the active GPU, g) performing a context switch between the active GPU and the inactive GPU, wherein the active GPU becomes inactive and the inactive GPU becomes active to process a next frame of the sequence of frames, and h) turning off the one of the first and second GPU that is inactive after the context switch.

\* \* \* \* \*